United States Patent [19]

Emura et al.

[11] Patent Number: 5,058,823
[45] Date of Patent: Oct. 22, 1991

[54] FISHING REEL CLUTCH MECHANISM

[75] Inventors: Masaharu Emura; Takehiro Kobayashi, both of Hiroshima, Japan

[73] Assignee: Ryobi Ltd., Hiroshima, Japan

[21] Appl. No.: 411,258

[22] Filed: Sep. 25, 1989

Related U.S. Application Data

[63] Continuation of Ser. No. 77,318, Jul. 24, 1987, abandoned.

[30] Foreign Application Priority Data

Jul. 25, 1986 [JP] Japan ............................ 61-114912[U]

[51] Int. Cl.5 .......................................... A01K 89/015
[52] U.S. Cl. .................................................. 242/261
[58] Field of Search ......................... 242/260, 261, 262

[56] References Cited

U.S. PATENT DOCUMENTS

| 4,142,694 | 6/1979 | Rankin Jr. | 242/260 |
| 4,168,812 | 9/1979 | Karlsson | 242/261 |
| 4,579,296 | 4/1986 | Karlsson et al. | 242/261 |
| 4,697,760 | 10/1987 | Aoki | 242/261 |
| 4,709,874 | 12/1987 | Murakami | 242/261 |
| 4,824,046 | 4/1989 | Emura et al. | 242/261 |
| 4,850,550 | 7/1989 | Aoki | 242/261 |

FOREIGN PATENT DOCUMENTS 60-78526/85 5/1985 Japan .
61-182263 11/1986 Japan .

Primary Examiner—Katherine Matecki
Attorney, Agent, or Firm—Finnegan, Henderson, Farabow, Garrett and Dunner

[57] ABSTRACT

A clutch mechanism for a fishing reel having a spool and a spool shaft supported at both ends by a pair of side plates. a handle for rotating the spool and spool shaft is engaged through a drive gear to a pinion gear. The pinion gear is slideably mounted on the spool shaft and the device includes clutch means on the spool shaft to engage and disengage the pinion gear with the spool shaft by moving the pinion gear axially on the spool shaft. A clutch cam moves the pinion gear axially and an operating lever is linked to the clutch cam for disengaging the pinion gear from the spool shaft. Rotation of the handle in a first direction causes the pinion gear to engage the spool shaft and an operating lever is rotatably supported on a shaft extending between the side plates of the fishing reel.

3 Claims, 4 Drawing Sheets

FISHING REEL CLUTCH MECHANISM

This is a continuation of application Ser. No. 07/077,318, filed July 24, 1987, and now abandoned.

BACKGROUND OF THE INVENTION

The present invention relates to a clutch mechanism for engaging and disengaging the rotational forces applied to the spool of a fishing reel, more particularly, a reel having a spool shaft supported at both ends and a handle for turning the spool.

Such a clutch mechanism normally comprises a pinion gear engaged with the drive gear on the handle shaft. The pinion gear is fitted on the spool shaft in such a manner that it rotates the shaft while being slidable in the axial direction in a manner such that the pinion gear engages a notched circular portion on the spool shaft. A clutch lever is engaged with the pinion so that the pinion gear can be slid in the axial direction and a clutch cam is disposed between the clutch lever and a support plate with a clutch cam being coupled to an operating lever. The pinion and the spool shaft are engaged and disengaged by the action of the clutch cam. The pinion gear and the spool shaft automatically engage when the handle of the reel is rotated in the forward direction, i.e., in the direction that will wind line onto the spool. A ratchet is associated with the operation of the reel handle.

FIGS. 6A and 6B show a conventional clutch mechanism of the type previously described which is disclosed in Unexamined Japanese Patent Application No. 78526/85. In such a device, the clutch mechanism includes an operating lever operatively associated with clutch engagement and disengagement switching means, including a clutch lever, a clutch cam, an operating lever and a dead point spring, which combine to provide the function of the previously described mechanism.

In the clutch mechanism shown in FIG. 6, a lever shaft is integrally coupled to the operating lever 018 which is slid in a narrow slot on the side plate to push one end of an interlocking lever 024 that is supported on that side plate. The interlocking lever rotates the clutch cam 017 and for that reason when the clutch is switched from disengagement to engagement, the reel is placed in a "flipped" state automatically by the rotation of the handle but this flipped state cannot be achieved manually using the operating lever because frictional resistance of the sliding surface in the narrow opening in the side plate on the lever shaft is too high. As a result, the lever shaft is inclined due to the eccentric pushing of the operating lever and the switching action is likely to be incorrect.

FIG. 7 depicts a proposed clutch mechanism disclosed in Japanese Utility Model Application No. 67572/85. In the mechanism of FIG. 7, the clutch mechanism includes a clutch engagement and disengagement switching means comprised of a clutch lever 016, a clutch cam 017, an interlocking lever 024, an operating lever 018, and a dead point spring 019. Also included is a cam 020 in the switching means that makes it possible to establish a state in which the clutch cannot be kept disengaged.

In the mechanism shown in FIG. 7, the clutch cam and the operating lever are coupled together by a pin. As a result, the clutch can be switched from the disengagement to the engagement condition manually. However, since the operating lever is moved along a narrow opening in the slide plate, the same wrong action as can occur in the mechanism of FIGS. 6A and 6B can occur in the mechanism depicted in FIG. 7.

Accordingly, it is the object of the present invention to provide a clutch mechanism for a fishing reel having a spool shaft supported at both ends where disengagement or engagement of the clutch can be effected either automatically or manually. In such an operation, the members are rotated so as to avoid causing an incorrect action of engagement caused by the sliding motion in the clutch mechanisms shown in FIGS. 6A, 6B and 7. Specifically, the disengagement and engagement of the clutch can be switched either automatically by the rotation of the handle or manually by the operation of an operating lever.

It is a further advantage of the present invention that the rotating motion of the operating lever is transmitted to the clutch cam through a lever plate with the number of parts comprising a clutch mechanism reduced. This simplifies manufacture of the device and reduces its manufacturing cost.

Additional objects and advantages of the invention will be set forth in the description which follows and part will be obvious from the description or learned from the practice of the invention. The objects and advantages of the invention may be realized and obtained by means of the instrumentalities and combinations particularly pointed out in the appended claims.

SUMMARY OF THE INVENTION

To achieve the foregoing objects in accordance with the purpose of the invention as embodied and broadly described herein, there is provided a clutch mechanism for a fishing reel having a spool shaft supported at both ends. The mechanism includes a pair of side plates for supporting opposite ends of the spool shaft. A handle rotates the spool shaft and drives a pinion gear through a drive gear connected to the handle. The pinion gear is slideably mounted on the spool shaft. Means are provided on the spool shaft for engaging the pinion gear. Clutch means are provided on the spool shaft to engage and disengage the pinion gear from the engaging means on the spool shaft in response to the pinion gear being moved axially on the spool shaft. The clutch means for moving the pinion gear axially includes a clutch operating lever linked to the clutch cam for disengaging the pinion gear from the spool shaft. Rotation of the handle in a forward direction causes the pinion gear to engage the spool shaft. The operating lever is rotatably supported by means of a lever shaft affixed to the operating lever. The lever shaft extends between the pair of side plates and is supported thereby.

preferably, the clutch mechanism includes a lever plate affixed to one end of the lever shaft, pin means for connecting the lever plate to the clutch cam for transmitting rotary motion of the operating lever to the clutch cam. It is further preferred that the clutch means include a dead point spring for urging the lever plate to move in either of two directions from the dead point. It is also preferred that the clutch mechanism includes means for changing the dead point of the dead point spring in response to the movement of the operating lever.

BRIEF DESCRIPTION OF THE DRAWINGS

The accompanying drawings which incorporate and constitute a part of the specification illustrate a preferred embodiment of the invention and together with the description of the preferred embodiment serve to explain the principles of the invention. Of the Figures.

DESCRIPTION OF THE PREFERRED EMBODIMENT

Figure 1:
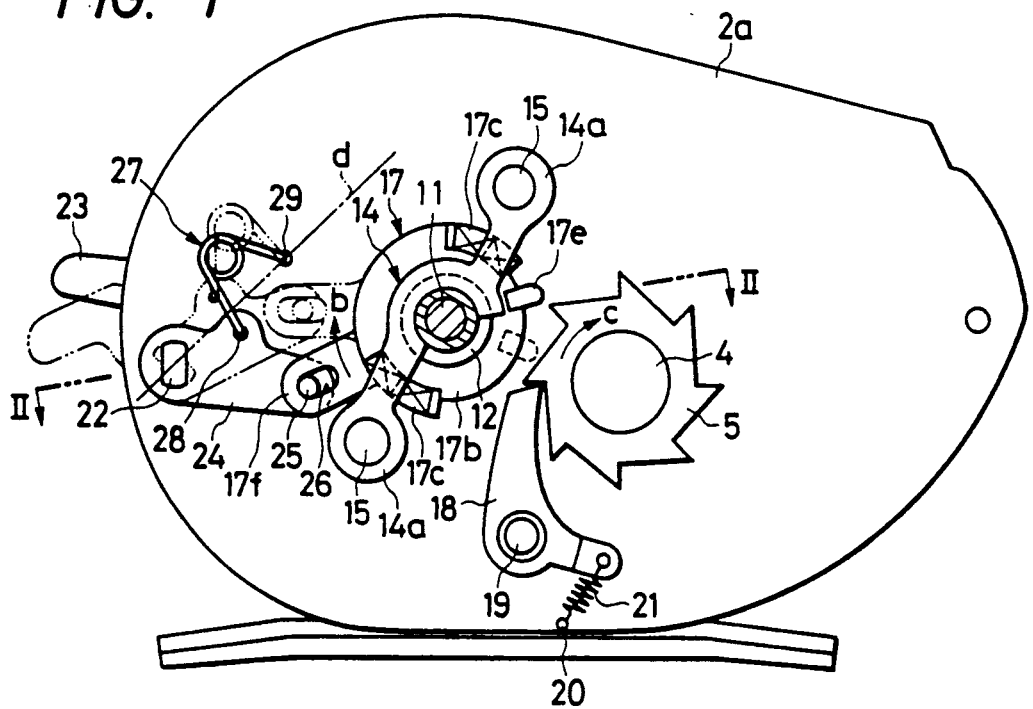
FIG. 1 is a side view of one embodiment of the present invention having a clutch mechanism for a fishing reel with a spool shaft supported at both ends thereof.

An embodiment of the present invention, which is a clutch mechanism for a fishing reel having a spool shaft supported at both ends thereof, is hereafter described in detail with reference to the drawings attached hereto.

As shown in FIGS. 1-5, the fishing reel includes a ratchet 5 on a ratchet shaft 4 supported by support shaft 3. The shaft 3 is in turn supported by the side plate 2a of the right side frame 2. The right side frame 2 and the left side frame 1 constitutes the body of a fishing reel having a spool shaft 11 rotatedly supported at the ends thereof. The spool shaft 11 is supported by bearings 9 in the side plate 2a of the left side frame and the cover plate 1b secured to the outside of the side plate 1a in the left side frame. As is most clearly depicted in FIG. 3, a drive gear 8 and drag means 7 are disposed between the ratchet 5 and a star drag handle 13a affixed to the ratchet shaft 4. As shown most clearly in FIG. 2, the spool shaft 11 extends through the side plate 1a of the left side frame 1 and supports the spool 10. A pinion gear 12 is engaged with the drive gear 8, with the pinion gear being disposed on the end portion of the spool shaft 11. The end portion of the spool shaft 11 extends between the side plate 2a and the cover plate 2b which is secured to the outside of the side plate 2a by means of screws. The pinion gear 12 can be moved in the axial direction on the spool shaft 11 as shown by the arrows a and a' in FIGS. 2 and 3 to be engaged or disengaged from engaging means, here embodied as a notched circular portion 11b on the spool shaft 11. In such a manner, the pinion gear 12 may transmit or disconnect the torque applied to the spool shaft by the handle 13. The handle 13 rotates the drive gear 8 and ratchet 5 throuqh the ratchet shaft 4.

Figure 3:
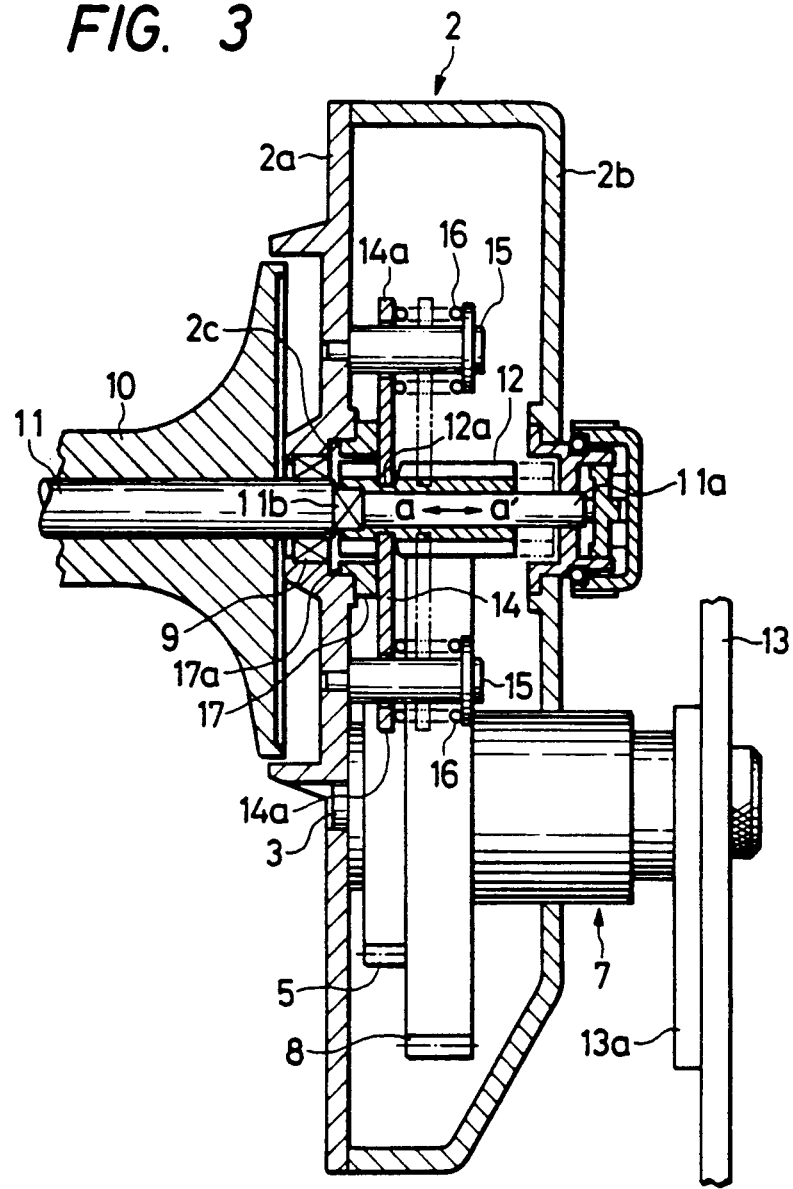
FIG. 3 shows another longitudinal cross section of the embodiment of FIGS. 1 and 2.

As shown clearly in FIG. 3, the clutch lever 14 is engaged in an annular peripheral recess 12a in the pinion gear 12. As shown in FIG. 1, the clutch lever includes 2 arms 14a symmetrically projecting therefrom that are fitted on guide pins 15 pressed in the side plate 2a. In such a manner, the clutch lever can be moved in the axial direction on the spool shaft 11. As shown in FIG. 3, the springs 16 around the guide pins 15 resiliently urge the arms 14a toward the side plate 2a.

Figure 2:
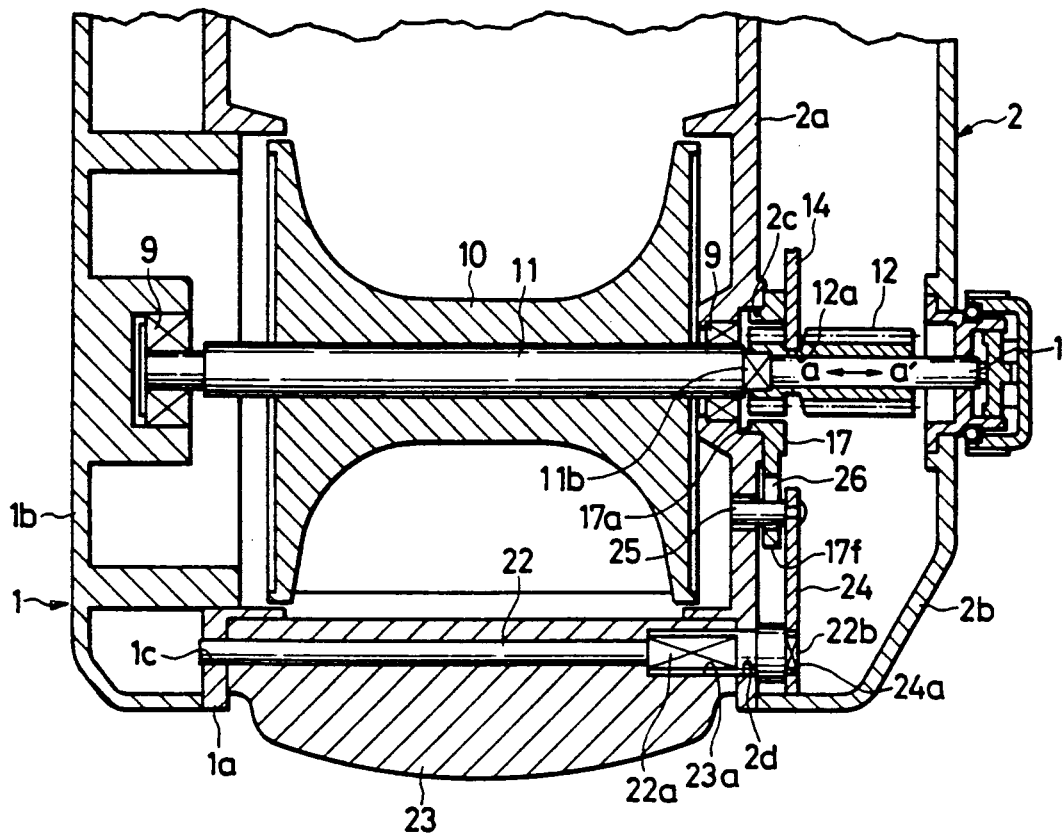
FIG. 2 shows a longitudinal cross section of the embodiment of FIG. 1 along the lines II—II.
Figure 4A:
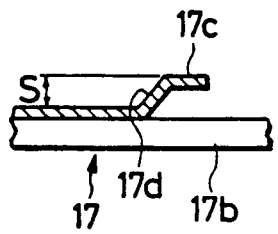
FIGS. 4A and 4B show longitudinal cross section views of clutch cam portions which can alternatively be used in the depicted embodiment.
Figure 4B:
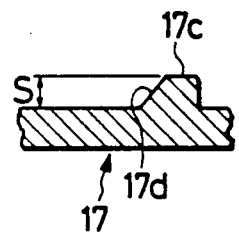
Figure 6A:
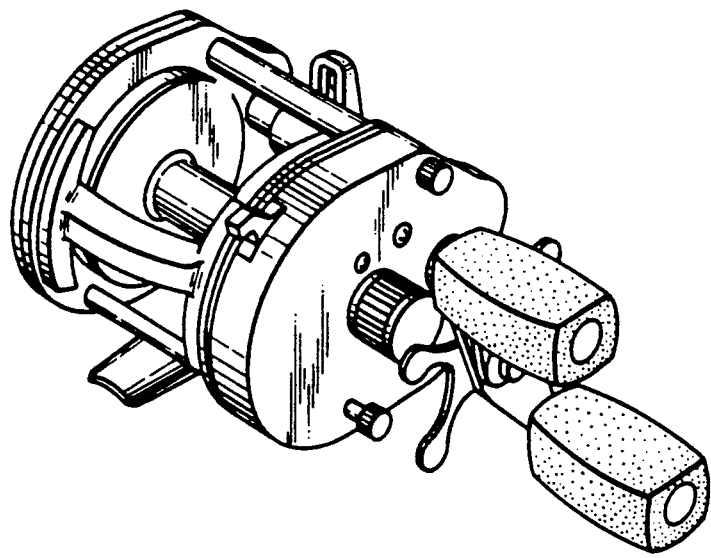
FIG. 6A shows a perspective view of a conventional fishing reel having a clutch mechanism and a spool shaft supported at both ends thereof.
Figure 6B:
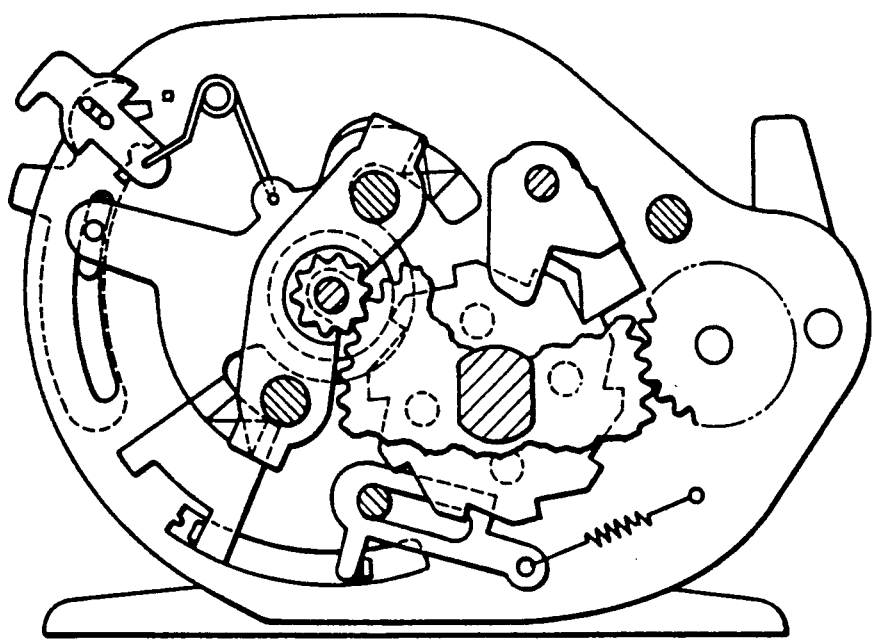
FIG. 6B shows a side view of a conventional clutch mechanism with the mechanism depicted in a state where the spool is rotated

As shown in FIGS. 2 and 3, a clutch cam 17 is rotatably supported between the clutch lever 14 and the side plate 2a. As shown in FIGS. 4A and 4B, the clutch cam 17 includes a cylindrical central portion 17a which is fitted between the pinion gear 12 and the inside surface of the opening 2c in the side plate 2a. The peripheral annular portion 17b of the clutch cam 17 has a face portion 17b which has a height (depicted as displacement S in FIGS. 4A and 4B) substantially larger than the axial length of the engagement of the pinion gear 12 in a notched circular portion 11b of a spool shaft 11. The clutch cam 17 further includes cam faces 17d which project obliquely with respect to the axis of the clutch cam as shown in FIGS. 4A and 4B. When the clutch cam 17 is rotated from a clutch engagement position depicted by the solid lines in FIG. 1 to a position shown by the broken lines of FIG. 1 in the direction shown by the arrow b, the cam faces 17c contact the arms 14a of the clutch lever 14 and the cam faces 17c move under the arms such that the clutch lever is displaced by the quantity S along with the pinion gear in a direction a' as shown in FIGS. 2 and 3 against the force of the springs 16. As a result, the pinion gear 12 is disengaged from the notched circular portion 11b of the spool shaft 11, thereby disconnecting the handle 13 from the spool shaft 11 to establish a state of clutch disengagement.

As shown in FIG. 1, the clutch cam 17 includes projection 17e projecting from the peripheral portion 17b. As depicted in a state of clutch engagement as shown by the embodiment depicted in the solid lines in FIG. 1, the projection 17e does not interfere with the ratchet 5. When the clutch is disengaged by rotating the clutch cam 17 as described above, the projection 17e is placed in a position such that it interfers with the ratchet 5. As a result, the ratchet 5 contacts 17e as the ratchet is rotated in the direction of the arrow c by means of the handle 13. The direction of forward rotation is the direction in which line is wound onto the spool of the fishing reel by rotating the handle 13. During forward rotation of the handle 13, the ratchet 5 pushes the projection 17e counterclockwise to the position shown in solid lines in FIG. 1. The clutch cam 17 is kept in a state of clutch disengagement by means of a dead point spring 27 which applies a force to the lever plate 24. Subsequently, the clutch cam 17 may be rotated in the reverse direction by the dead point spring 27. Thus, the clutch can be engaged and disengaged automatically by rotation of the handle 13.

As shown most clearly in FIG. 1, there is included an anti-reversing pawl 18 rotatably supported on a pin 19 pressed into the side plate 2a. A spring 21 affixed at one end to the anti-reversing pawl and the other to a spring mount 20 of the side plate 2a urges the pawl into engagement with the ratchet 5.

As shown in FIG. 2, a lever shaft 22 is rotatably fitted in coaxial shaft holes 1c and 2d in the side plates 1a and 2a of the side frames 1 and 2. An operating lever 23 is secured to the lever shaft 22 between the side plates 1a and 2a such that the operating lever 23 and the lever shaft 22 are rotated together. One end of the lever plate 24 is secured to the end portion of the lever shaft 22 which extends through the side frame 2 through the side plate 2a in a manner such that the lever plate and the lever shaft are rotated together. A pin 25 is affixed to the tip of the lever plate 24.

As shown in FIG. 1, the cam 17 includes a projection 17f extending from the peripheral annular portion 17b in the radial direction having an elongated opening 26 extending in the radial direction with respect to the clutch cam. The pin 25 is engaged in the opening 26 such that the projection 17f slides within the opening 26 so that the clutch cam 17 and the lever plate 24 are rotatably coupled. Thus, the rotation of the operating lever 23 is transmitted to the clutch cam 17. The embodiment includes a hairpin type spring 27 having a loop therein to enhance its elastic characteristics. The ends of the hairpin spring 27 are bent and inserted in holes adjacent the spring to pivot within the holes.

One end of the dead point spring 27 is mounted in a hole 28 comprising spring mount on the lever plate 24. The other end of the spring 27 is anchored in a spring mount 29 on the side plate 2a. The dead point spring 27 urges the lever plate 24 to turn the lever plate either to the right or to the left across the dead point line d as shown in FIG. 1, thereby shifting the clutch cam 17 into the state of engagement or disengagement.

The lever shaft 22, the operating lever 23 and the lever plate 24 include elliptical portions 22a and 22b which engage complimentary holes 23a and 24a so that the lever shaft is secured to the operating lever in the lever plate in a manner that precludes relative rotation therebetween.

Figure 5:
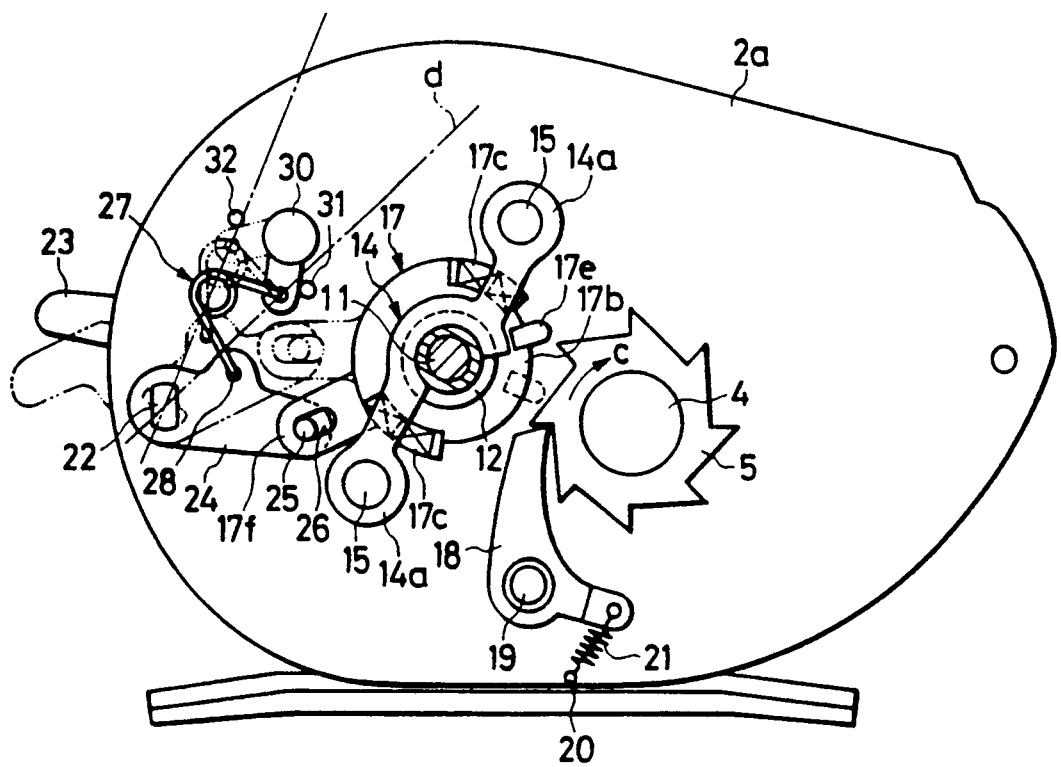
FIG. 5 shows another embodiment of the present invention using a flipping cam mechanism.
Figure 7:
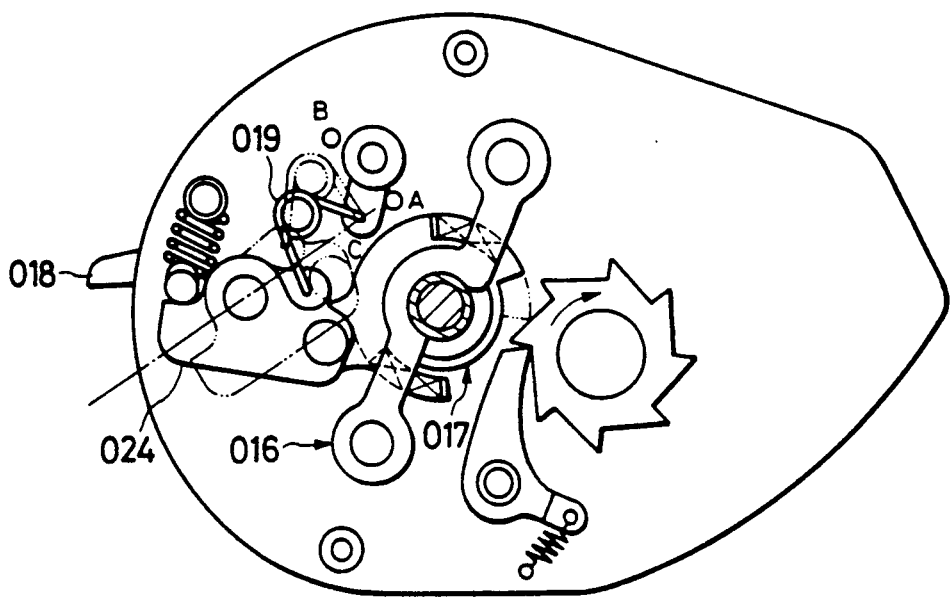
FIG. 7 is a side view of another clutch mechanism for a fishing reel having a spool shaft supported at both ends thereof.

FIG. 5 shows an additional embodiment of the clutch mechanism of the present invention, including what is termed a "flipping" function which makes it impossible to automatically maintain the clutch in a state of disengagement. In this embodiment stops 31 and 32 are provided on the side plate 2a to engage the rotating end of a flipping lever 30 and the lever plate 24, thereby limiting the rotation of the flipping lever 30 to a prescribed angle. When the flipping lever 30 is in the position shown by the full lines in FIG. 5, the deadpoint spring mount (the hole 28 in the lever 24) would be selectively urged either in a clockwise or counterclockwise direction through neutral (or "deadpoint") line d corresponding to the deadpoint of the spring 27. When the flipping lever 30 is shifted into a position depicted in the broken lines of FIG. 5, the dead point line d is displaced to the position shown by the straight dashed line passing through the stop 32. In such a configuration, the operating lever 23 is rotated to disengage the clutch and the operating lever is released by the operator of the fishing reel. As a result, the lever plate 24 is rotated by the dead point spring 27 so that the clutch is engaged.

Because the operating lever and the lever plate which operates the clutch cam are turned on the lever shaft which is rotated with the operating lever and the lever plate, the forces acting on the operating lever do not act in a manner such as to incline the lever shaft as in conventional clutch mechanisms. For that reason, an eccentric, high friction resistance is not generated in the sliding surfaces of the members such that the clutch is not improperly actuated. Because the operating lever is supported at both ends, at both the right and left side plates, the clutch has a light, smooth engagement.

The invention has been disclosed in terms of preferred embodiments, however, the invention is not limited thereto. The scope of the invention is determined by the appended claims and their equivalents.

What is claimed is:

1. A clutch mechanism for a fishing reel having a spool shaft supported at both ends thereof, said mechanism comprising:
   a pair of side plates supporting opposite ends of said spool shaft;
   a handle for rotating said spool shaft;
   a drive gear connected to said handle;
   a pinion gear engaged with said drive gear, said pinion gear being slidably mounted on said spool shaft;
   means on said spool shaft for engaging said pinion gear; and
   clutch means on said spool shaft to selectively engage and disengage said pinion gear from said engaging means on said spool shaft in response to said pinion gear being moved axially on said spool shaft, said clutch means including a clutch cam concentric with said spool shaft for moving said pinion gear axially, a cam arm for actuating said clutch cam, a clutch operating layer linked to said clutch cam for disengaging said pinion gear from said engaging means, means for causing said pinion gear to engage said spool shaft in response to forward rotation of the handle, a lever shaft affixed to said operating lever, a lever plate affixed to one end of said lever shaft and pin means connecting said lever plate and said cam arm to transmit rotary motion of said operating lever to said cam arm, said operating lever being rotatably supported by said lever shaft affixed to said operating lever, said lever shaft extending between said pair of side plates and being supported thereby, a dead point spring for urging said lever plate to move in either of two directions from a dead point of said spring, wherein said dead point spring is a hairpin type spring, and a flipping lever rotationally mounted to one of said side plates, and means for limiting the rotation of said flipping lever, one end of said spring being engaged to said lever plate, and an opposite end of said spring being engaged to said flipping lever.

2. The clutch mechanism of claim 1 wherein the dead point of said dead point spring is displaced in response to movement of said flipping lever.

3. The clutch mechanism of claim 1 wherein said clutch mechanism includes a ratchet gear on said handle and projection means on said clutch cam for engaging said ratchet to operate said clutch cam.

* * * * *

UNITED STATES PATENT AND TRADEMARK OFFICE
CERTIFICATE OF CORRECTION

PATENT NO. : 5,058,823

DATED : October 22, 1991

INVENTOR(S) : Masaharu Emura et al.

It is certified that error appears in the above-identified patent and that said Letters Patent is hereby corrected as shown below:

Abstract, line 3, change "a" to --A--.

Claim 1, column 6, line 28, change "layer" to --lever--.

Signed and Sealed this

Twentieth Day of April, 1993

*Attest:*

MICHAEL K. KIRK

*Attesting Officer*    *Acting Commissioner of Patents and Trademarks*